United States Patent [19]

Mitchell

[11] 4,181,145
[45] Jan. 1, 1980

[54] TWO-WAY CHECK VALVE

[75] Inventor: Clarence I. Mitchell, Xenia, Ohio

[73] Assignee: General Motors Corporation, Detroit, Mich.

[21] Appl. No.: 904,317

[22] Filed: May 10, 1978

[51] Int. Cl.² ............................................. F16K 24/00
[52] U.S. Cl. ................................. 137/493.8; 137/512.4; 137/846; 188/71.1; 188/71.9
[58] Field of Search ........................... 188/71.9, 71.1; 137/512.4, 512.15, 493.8, 846

[56] References Cited

U.S. PATENT DOCUMENTS

| | | | |
|---|---|---|---|
| 2,348,097 | 5/1944 | Smith | 137/362 |
| 3,159,176 | 12/1964 | Russell et al. | 137/493.1 |
| 3,369,496 | 2/1968 | Bushmeyer | 417/539 |
| 3,941,149 | 3/1976 | Mittleman | 137/493.1 |
| 3,991,859 | 11/1976 | Coulter et al. | 188/71.9 |

FOREIGN PATENT DOCUMENTS 2276526  1/1976  France ................... 137/493.8

*Primary Examiner*—George E. A. Halvosa
*Attorney, Agent, or Firm*—D. D. McGraw

[57] ABSTRACT

A self-adjusting rear disc brake assembly provided with a parking brake to mechanically actuate the disc brake, as well as having hydraulic service brake actuation, has a confined air space between the outer piston and the inner piston. The two-way check valve embodying the invention operates to maintain the confined air space substantially at ambient air pressure while preventing contamination of the brake actuating mechanism by air borne contaminants normally encountered in the area of a vehicle rear brake mechanism.

2 Claims, 5 Drawing Figures

TWO-WAY CHECK VALVE

The invention relates to a normally closed two-way check valve for equalizing air pressure in a confined air space in a disc brake caliper assembly with ambient air pressure, and preventing foreign contaminant material from having any substantial access to the air space. The check valve embodying the invention is made of a rubber-like material such as silicone rubber.

The disc brake caliper assembly in which the valve is preferably used has an outer piston and an inner piston defining therebetween a confined air space. A clutch mechanism is formed on mating surfaces of the pistons for adjustment and parking brake actuation of the caliper assembly. A brake of this type is disclosed in detail in U.S. Pat. No. 3,770,082, issued Nov. 6, 1973. As the brakes are operated, the confined air space will be subjected to changes in temperature in a cyclical manner, with consequent changes in air pressure in the confined air space. It is therefore desirable to provide a vent for this space so that such changes in pressure do not have any effect on the operation of the caliper assembly.

One or more vent passages have been previously provided in the face of the outer piston. However, such open passages allow foreign contaminant material to enter the confined air space and contaminate the clutch faces as well as the seal between the pistons. A rubber-like check valve has also been used in production, such a check valve being placed in an opening in the face of the outer piston and permitting ambient air to enter the confined air space as the air space cools through the provision of a single duckbill check valve. The valve assembly was so arranged that air from the confined air space could be exhausted through the opening between the opening wall and the valve assembly. Therefore the valve assembly was fitted somewhat loosely in the opening or provided with a passageway which was somewhat protected by one of the mounting flanges of the valve assembly. However, a better protective device has been found to be desirable since some foreign contaminant materials could still enter the confined air space around the valve body.

The valve assembly embodying the invention has a body section provided with first and second axially spaced mounting and sealing flanges which hold and seal the check valve assembly in the opening provided in the disc brake caliper structure. The body section has a pair of normally closed duckbill check valves formed therein. Each of the valves open and close in axially opposite directions relative to the other so that only one of the pair of valves will open to exhaust air from the air space to ambient air when the pressure in the confined air space increases to a predetermined pressure level above ambient air pressure sufficient to open that one check valve. Only the other of the pair of check valves will open to admit ambient air into the air space when the pressure in the air space decreases to a predetermined pressure level below ambient air pressure. This occurs, for example, when the brakes have been actuated and the air in the confined air space heated, causing the pressure therein to increase above ambient air pressure and air to be exhausted. Later, when the brake cools, the pressure in the confined air space decreases and falls below ambient air pressure. The check valve therefore prevents the pressure from reaching a pressure level in either direction which is undesirable. Thus a higher pressure will not be forced past the inner piston seal into the hydraulic portion of the brake, nor will a lower pressure tend to hold the inner piston more tightly into engagement through the clutch surfaces with the outer piston even though the brake is released. At the same time, the valve provides an excellent seal against the entrance of foreign contaminant material.

It is another feature of the check valve assembly embodying the invention that the oppositely extending duckbill check valves share a common flexible wall with the axially opposite wall edges thereof each defining one side of the valve slit or normally closed opening of one of the pair of duckbill check valves. It is another feature of the check valve assembly embodying the invention that the other side wall of each of the pair of duckbill check valves has an axially extending recess providing a flexible other side of the valve slit or normally closed opening. It is another feature of the check valve assembly embodying the invention that the side walls of each one of the pair of duckbill check valves define an entry chamber, each entry chamber opening through one of the mounting and sealing flanges and being tapered generally axially through the valve body toward the valve sides defining the normally closed valve opening or slit.

IN THE DRAWING

Figure 1:
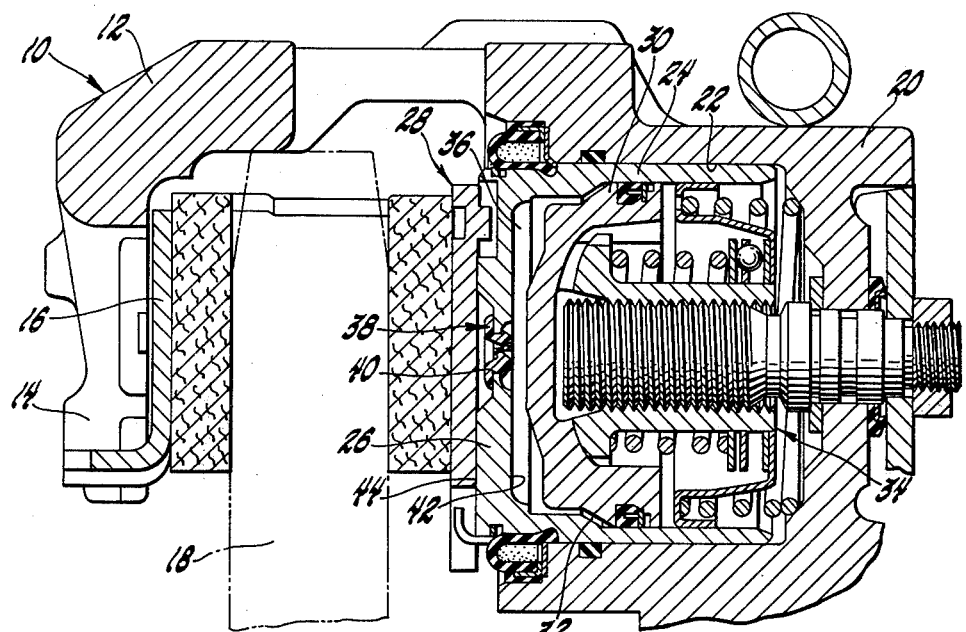
FIG. 1 is a cross section view of a disc brake caliper assembly having a check valve assembly embodying the invention.
Figure 2:
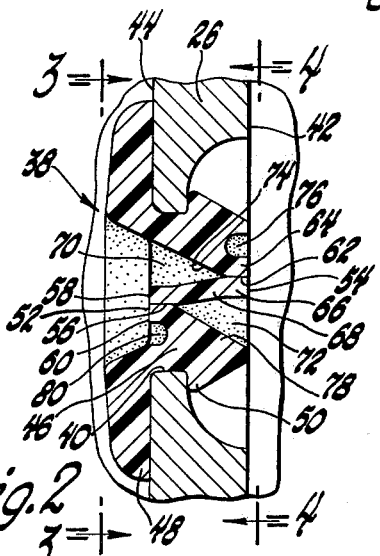
FIG. 2 is a cross section view of the check valve assembly of FIG. 1.
Figure 3:
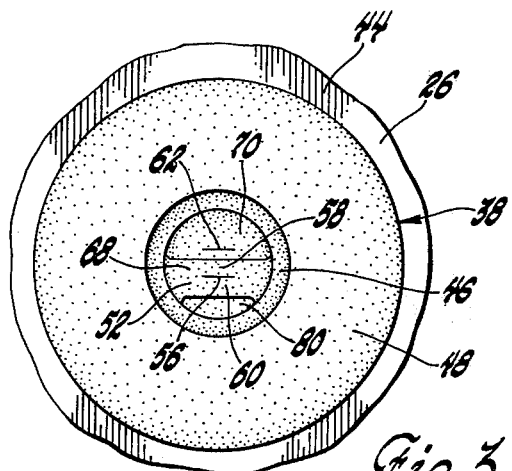
FIG. 3 is a view of the check valve assembly taken in the direction of arrows 3—3 of FIG. 2 and having parts broken away.
Figure 4:
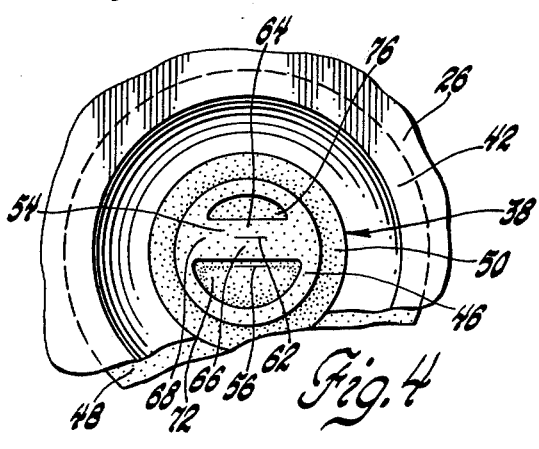
FIG. 4 is a view of the check valve assembly taken in the direction of arrows 4—4 of FIG. 2 and having parts broken away.
Figure 5:
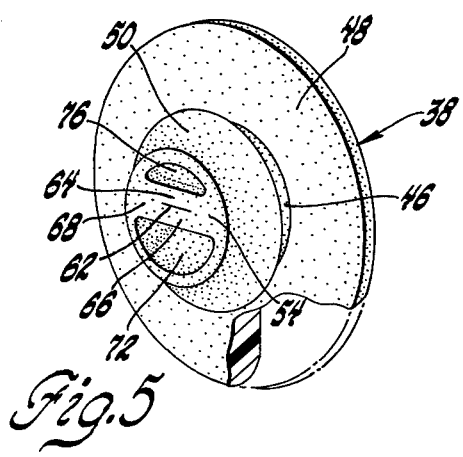
FIG. 5 is a perspective view of the check valve assembly, with parts broken away and in section.

The disc brake 10 of FIG. 1 is similar to that disclosed and claimed in the patent referred to above. It has a caliper housing 12 with one leg 14 having a brake shoe assembly 16 mounted thereon for braking engagement with one side of the disc 18. The other caliper leg 20 has a cylinder 22 formed therein. An outer piston 24 is reciprocably and sealingly mounted in cylinder 22. A piston face wall 26 receives another shoe assembly 28 which is arranged for braking engagement with the other side of disc 18. An inner piston 30 is reciprocably and sealingly mounted within outer piston 24. Clutch surfaces on mounting portions of pistons 24 and 30 define a clutch 32. A brake adjusting and parking brake actuating mechanism 34, which may be of the type which is the subject of the above noted patent, is contained within cylinder 22. A part of mechanism 34 extends outwardly of the cylinder so as to be mechanically actuated. A confined air space 36 is formed between pistons 24 and 30. The confined air space 36 is subject to cyclical heating or cooling and therefore changes in air pressure in the space. The check valve assembly 38 embodying the invention allows the confined air space 36 to be vented to ambient air upon a pressure increase relative to ambient air pressure, or to receive air from ambient air when the pressure in the confined air space decreases below ambient air pressure. The valve assembly is mounted in an opening 40 formed in the face wall 26 of piston 24, the opening communicating confined air space 36 with ambient air.

The valve assembly embodying the invention is illustrated in greater detail in FIGS. 2 through 5. The piston face wall 26 has an inner wall 42 forming a wall of the confined air space 36, and an outer wall 44 connected with ambient air. The check valve assembly 38 has a body section 46 which extends through opening 40. The body section has axially spaced mounting and sealing flanges formed thereon. The outer mounting and sealing flange 48 fits in a sealing manner against outer wall 44 of the piston wall 26. The inner mounting and sealing flange 50 sealingly fits against a recessed portion of the inner wall 42 of piston wall 26. The valve assembly 38 is therefore tightly retained in position in opening 40 and so sealed that no air or foreign contaminant material will pass between the check valve assembly and the surface defining the opening 40 of piston wall 26, either to or from the confined air space 36.

The body section 46 has a first check valve 52 and a second check valve 54. These check valves are normally closed duckbill check valves. Check valve 52 has a slit or normally closed valve opening 56 defined by flexible, resilient valve sides 58 and 60. Check valve 54 has a valve slit or normally closed valve opening 62 defined by flexible, resilient valve sides 64 and 66. A common wall 68 is provided between valve entry chamber 70 of valve 54 and valve entry chamber 72 of valve 52. Common wall 68 has its axially opposite sides forming valve sides 58 and 66. The side wall 74 of entry chamber 70 terminates in its inner end at valve side 64. An axially extending recess 76 in the inner end of the valve assembly provides for flexibility of the valve side 64. Side wall 78 of entry chamber 72 extends from the inner side of valve assembly 38 outwardly and terminates to form valve side 60 of check valve 52. An axially extending recess 80 formed in side wall 78 provides for the flexibility of valve side 60.

Check valve 52 is normally closed but will open when air pressure in confined air space 36 reaches a predetermined level which will cause flexure of valve sides 58 and 60 and opening of the valve slit 56. When the pressure is thus released, the flexible nature of the valve sides re-close the check valve. Similarly, when the air pressure in confined air space 36 decreases below ambient air pressure to a predetermined pressure level, the pressure differential causes the sides 64 and 66 of valve 54 to be moved apart and open valve slit 62, allowing ambient air pressure to be introduced into air space 36. The flexible nature of the valve sides then causes the valve to close upon the relief of the pressure differential.

What is claimed is:

1. A self-retaining and sealing valve insert assembly for sealing a confined air space in a disc brake or the like and for substantially equalizing the air pressure in the confined air space with ambient air pressure, said valve insert assembly being made of a rubber-like material and comprising:

a body having side walls and first and second axially spaced mounting and sealing flanges formed thereon for holding and sealing said valve insert assembly in an opening provided in a portion of the disc brake defining a wall having the confined air space on one wall side and ambient air pressure on the other wall side, said body having formed therein a pair of normally closed duckbill check valves each of which terminates with a valve slit and each of which opens and closes in an axially opposite direction relative to the other so that one of said pair of duckbill check valves will open to permit movement of air in one direction through the valve insert assembly and the other of said pair of duckbill check valves will open to permit movement of air in the opposite direction through the valve insert assembly upon predetermined pressure differentials thereacross, said duckbill check valves' side walls including a first common flexible wall with the axially opposite wall edges thereof each defining one side of the valve slit of one of said pair of duckbill check valves, and another side wall of each of said pair of duckbill check valves having an axially extending recess providing a flexible other side of the valve slit of one of said pair of duckbill check valves cooperating with said one side thereof to open and close the valve slit formed therebetween for valving action in response to a pressure differential.

2. A self-retaining and sealing valve insert assembly for sealing a confined air space in a disc brake or the like and for substantially equalizing the air pressure in the confined air space with ambient air pressure, said valve insert assembly being made of a rubber-like material and comprising:

a body having side walls and first and second axially spaced mounting and sealing flanges formed thereon for holding and sealing said valve insert assembly in an opening provided in a portion of the disc brake defining a wall having the confined air space on one wall side and ambient air pressure on the other wall side, said body having formed therein a pair of normally closed duckbill check valves each of which terminates with a valve slit and each of which opens and closes in an axially opposite direction relative to the other so that one of said pair of duckbill check valves will open to permit movement of air in one direction through the valve insert assembly and the other of said pair of duckbill check valves will open to permit movement of air in the opposite direction through the valve insert assembly upon predetermined pressure differentials thereacross, said duckbill check valves' side walls including a first common flexible wall with the axially opposite wall edges thereof each defining one side of the valve slit of one of said pair of duckbill check valves, and another side wall of each of said pair of duckbill check valves having an axially extending recess providing a flexible other side of the valve slit of one of said pair of duckbill check valves cooperating with said one side thereof to open and close the valve slit formed therebetween for valving action in response to pressure differential, said side walls of each one of said pair of duckbill check valves defining an entry chamber, each entry chamber opening through one of said mounting and sealing flanges and being tapered generally axially through said body toward said valve sides and slit.

* * * * *